B. F. Taft,
Boring Wood.
Nº 12,078.   Patented Dec. 12, 1854.
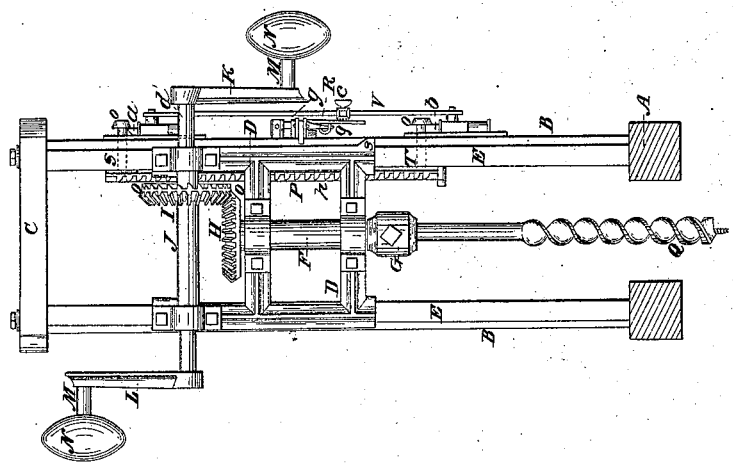
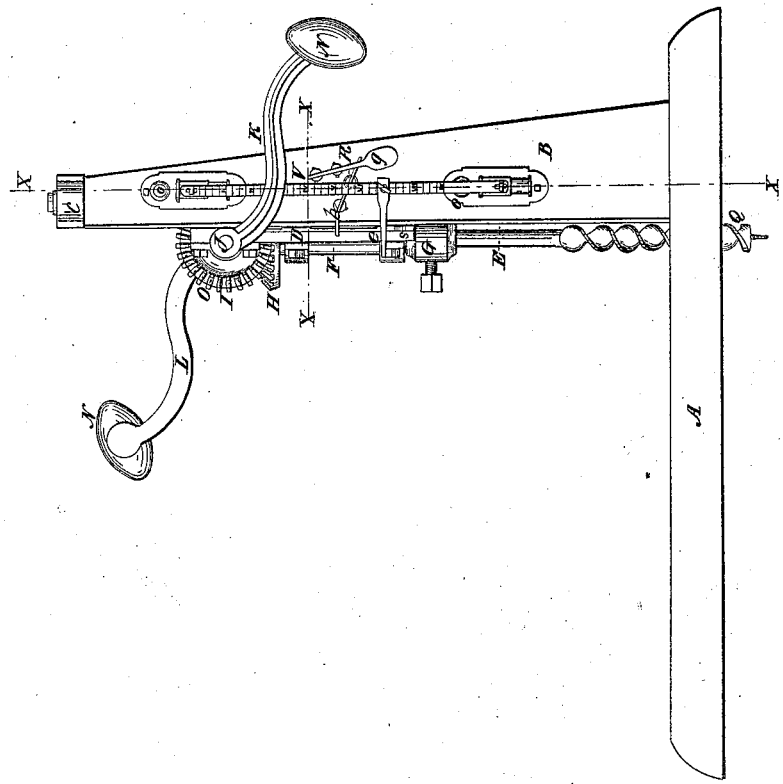

B. F. Taft,
Boring Wood.
Nº 12,078. Patented Dec. 12, 1854.
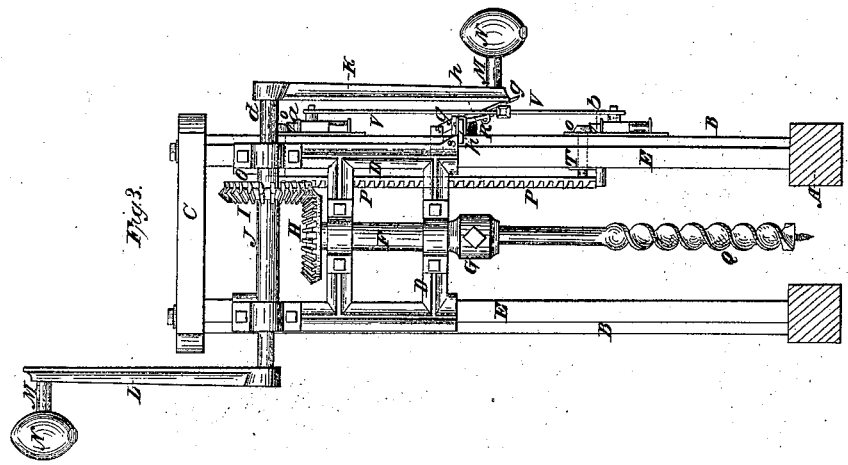
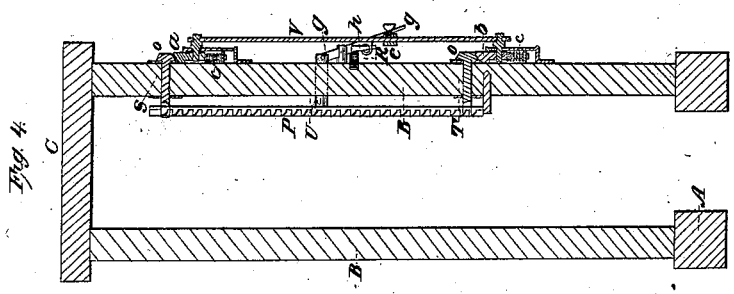
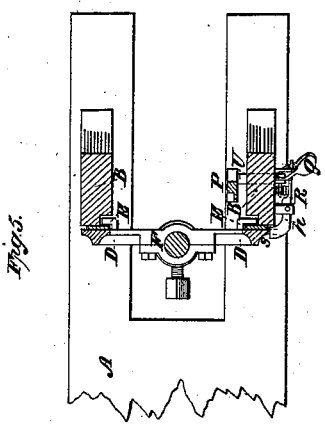

UNITED STATES PATENT OFFICE.

BENJAMIN F. TAFT, OF SOUTH GROTON, MASSACHUSETTS.

BORING-MACHINE.

Specification of Letters Patent No. 12,078, dated December 12, 1854.

*To all whom it may concern:*

Be it known that I, BENJAMIN F. TAFT, of South Groton, in the county of Middlesex and State of Massachusetts, have invented a certain new and useful Improvement in Machines for Boring Wood, of which the following is a full, clear, and exact description, reference being had to the accompanying drawing, which make part of this specification, and in which—

Figure 1, represents a side elevation of a machine embracing my improvements, with the auger depressed into the position, it would occupy in commencing to bore a mortise; Fig. 2 an end view of the same, except the base which is in section; Fig. 3, a similar view, except that the auger is raised; Fig. 4, a vertical section at the line $x\ x$ of Fig. 1, and Fig. 5, a horizontal section of the machine at the line $\#\ \#$ of Fig. 1.

My invention and improvement consists of certain contrivances, whereby the boring bit is arrested in its operation and withdrawn from the wood when it has penetrated a given depth, for which the mechanism is set; and as this mechanism is adjustable, it can be set to arrest the descent of the bit, the instant it has penetrated to the depth required, by which means the measuring of the depth of the hole is dispensed with, and all danger of boring too shallow or too deep avoided; so that on one hand the wood is not weakened or marred by boring too deep, and on the other much labor is saved in measuring and cutting out the wood when the boring is too shallow.

My invention consists further in the peculiar form of the cogs of the rack and pinion for raising the boring bit. This form of the teeth admits of their being thrown into gear at any point during the descent of the auger, and not like common gearing, only when the cogs of the pinion are opposite the spaces between the cogs of the rack. It also permits the teeth of the rack and pinion, while in gear to slip over each other under certain circumstances, while under other circumstances they engage with each other firmly without liability to slip.

My invention consists further in the peculiar construction and arrangement of the reversing mechanism, whereby the longitudinal motion of the boring bit is reversed to withdraw it from the wood.

The machine represented in the drawings should be of such a size, that it can be conveniently carried by the operator from one piece of wood to another, where the boring is required to be done.

The frame consists of a base (A) on which two uprights (B) connected at the top by a bar (C) are firmly erected. Upon these uprights, the boring mechanism is mounted. This consists of a carriage (D) which slides up and down on guides (E) secured to the uprights (B). This carriage carries a mandrel (F) in a position parallel to the uprights (B) in suitable boxes on the cross bars of the carriage. On the lower end of this mandrel a socket (G) to receive the shank of the boring bit, is made and fitted in the usual manner. On the upper end of the mandrel (F) a miter wheel (H) is mounted which gears into another wheel (I) of the same kind on a shaft (J) mounted in boxes on the upper end of the carriage. The shaft (J) of the wheel (I) extends beyond both sides of the carriage, and its ends are fitted with cranks (K and L) the wrists (M) of which are fitted with swiveled knobs (N) for the operator of the machine to take hold of to turn the wheels.

By revolving the cranks, the shaft (J) is turned; and this turning a miter wheel (I) which gears into a second miter wheel (H) communicates motion to the mandrel (F) on which the last mentioned wheel is mounted; and the mandrel turns the boring bit attached to its lower extremity.

If as represented in the drawing, the boring bit has a screw point to feed itself, the simple turning of the crank, without reference to the weight of the carriage and bit, will cause it to feed at the proper speed, and the boring to progress properly; but no mechanism has thus far been described that will indicate how deep the hole is made, or arrest the boring at any required depth. I will therefore next proceed to describe the mechanism for effecting this object.

On the driving shaft (J) across the upper end of the carriage, a wheel (O) with cog teeth of peculiar form is mounted. This wheel may either be separate from the miter wheel (I) or cast in one piece with it. The latter mode of construction has been adopted in this instance. This wheel gears into a rack (P) on the inside of one of the uprights (B) of the frame. The teeth of this rack and the teeth of the pinion (O) are of a wedge form, the upper side of the teeth projecting at right angles to the face of the rack, and the under sides being inclined at an angle of about 45°.

The teeth of the pinion are made with one side in a radial plane, and the other inclined so as to approximate very closely in shape to those of the rack. The inclined sides of the approximate teeth of the rack and pinion are respectively on opposite sides of the teeth, so that the radial side of the teeth of the wheel, will meet the perpendicular side of the teeth of the rack, when the wheel is turned in one direction, and the inclined sides of the two will meet in case the motion of the wheel is reversed. The rack under this construction and arrangement of the teeth stands at the side of the wheel, and not beyond the periphery as in the case of the ordinary rack and pinion. The peculiar form of the teeth of the rack and pinion will insure their taking into each other without slipping when caused to approach for that purpose, and with little danger of the teeth of either being jammed or broken. The rack is provided with mechanism to move it toward and from the wheel for the purpose of throwing it into, and out of gear therewith.

When they are in gear, the frame (D) with the boring bit (Q) is necessarily raised when the pinion is turned in the direction which brings the radial sides of its teeth into gear with the perpendicular sides of the teeth of the rack, because the wheel can only turn in this direction by climbing up the rack. Preparatory however to raising the auger, the motion of the cranks are reversed and the auger is turned backward a sufficient number of times to withdraw the screw thread of the point of the auger out of the solid wood. This movement is not materially impeded by the rack, which, being held in gear with the pinion by springs, readily yields to allow the inclined sides of the teeth of the pinion to slip up the corresponding sides of the teeth of the rack, and pass over the same. The motion may now again be reversed and the bit raised to the desired height, when the rack is withdrawn from the pinion, and the borer left free to descend again to make another hole.

The mechanism for moving the rack into, and out, of gear with the wheel, both by hand and automatically will now be described. The rack instead of being rigidly attached to the side of the upright is mounted upon the inner end of three bars (S, T and U) which slide in transverse holes in the upright to allow the rack to move out and in far enough to gear and ungear with the wheel. The rack is pressed constantly from the upright (B) toward the wheel by the spring (R,) and when drawn back to disengage the two, is held by catches. These catches in this example are heads ($o$) on the outer ends of the bars (S, and T) which engage with two bolts ($a$ and $b$) connected by a rod (V) and constantly pressed toward the guide bars (S and T) by springs ($c$). If the bolts are withdrawn from the catches, it is plain that the rack will instantly be thrown by the spring (R) which through the medium of the lever ($g$) presses it outward, into gear with the wheel. This fact is taken advantage of, in working the machine, by causing a projection on the carriage (D), in this instance the projecting end ($d'$) of the shaft (J), to meet an arm ($e$), and, as the carriage continues to descend, press down this arm until the bolts are withdrawn from the catches, when the rack is instantly thrown into gear to stop the further descent of the borer, and to be ready to raise the carriage and boring bit. This determines the depth of the hole being bored. The arm ($e$) is attached to the rod (V) which connects the bolts, so that it moves both bolts simultaneously; and in order that holes may be bored to different depths, this arm is adjustable on the rod; and that the proper position of the arm may be more readily determined, the bar (V) is graduated with marks to which the arm is set, these marks indicating the depth to which the auger will penetrate below the level of the bottom of the frame.

In order that the carriage and boring tool, when raised may be held up without any attention on the part of the operator being necessary, a second projection ($s$) is formed on the lower end of the carriage. This projection has its under side at right angles to the side of the carriage, and its upper side inclined thereto at an angle of about 30°. As the carriage ascends, and when near the upper extremity of its range of motion, the inclined side of the projection turns aside a lever ($h$) which when the projection has passed, is turned back again by a spring; so that when the carriage has been fully raised, it is prevented from descending by the perpendicular side of the projection resting upon the lever.

By pressing upon the thumb piece ($g'$) the rack is withdrawn from the wheel, and the lever moved from beneath the projection, leaving the carriage, and boring bit, free to descend to bore another hole.

It is plain that the descent of the auger can at any moment be arrested, before it has arrived at the depth at which it would be arrested by the automatic stop, by simply depressing the bar (V) and withdrawing the catches ($a$, $b$) which would at once throw the rack (P) into gear with the wheel (O). If it should be deemed necessary several springs may be placed behind the rack to press it out, instead of the single spring now employed for that purpose. In this way both the descent and ascent of the carriage and boring tool are arrested and regulated.

It is obvious that when the arm (e) is once set, any number of holes may be bored precisely of the same depth, and that by changing the position of the arm, the depth of the holes will be correspondingly varied, without being in the least dependent upon the skill and judgment of the operator.

It is evident that the mechanism which has been described for performing the several functions of the machine may be greatly varied in construction and operation without the least departure from the principle of the invention. For example, the rack may be fixed, and the pinion arranged to yield on its shaft in a manner analogous to that in which the rack yields, but changes of this class are too obvious to require further description.

What I claim as my invention and desire to secure by Letters Patent, is—

1. The method herein described of arresting and reversing the longitudinal motions of the boring tool automatically, so as to bore the holes accurately to the required depth, and then withdraw the boring tool substantially as described.

2. I also claim the peculiar construction of the teeth of the rack and wheel, whereby they can be suddenly and at any point during the descent of the tool engaged, to arrest the boring at the instant required; and also so that in reversing the motion of the cranks, to turn the screw point of the auger out of the wood, the rack will yield to let the teeth of the pinion slip, until the screw point is withdrawn, when by reversing the motion of the cranks, the auger will be raised out of its hole.

3. I also claim the combination of the projection (d') on the carriage with the adjustable arm (e) and the bolts (a and b) whereby the rack is released and left free to engage with the wheel, when the boring tool has descended to the required depth.

4. I likewise claim the combination of the projection (s) on the carriage, with the spring lever (h) and the thumb lever (g') whereby the carriage is held up when the boring tool is withdrawn from the wood, and the boring suspended; and when it is required to resume the boring, the rack is disengaged from the wheel, and the end of the lever withdrawn from beneath the projection, to leave the carriage free to descend.

In testimony whereof, I have hereunto subscribed my name.

BENJ'N F. TAFT.

Witnesses:
ANDREW GARDNER,
E. SANDERS.